(12) United States Patent
Brunelle et al.

(10) Patent No.: US 6,654,902 B1
(45) Date of Patent: Nov. 25, 2003

(54) PERSISTENT RESERVATION IO BARRIERS

(75) Inventors: Alan David Brunelle, Merrimack, NH (US); Per Olov Wahlstrom, Lexington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/546,806

(22) Filed: Apr. 11, 2000

(51) Int. Cl.[7] .................................................. G06F 11/00
(52) U.S. Cl. ........................................... 714/4; 711/156
(58) Field of Search ........................... 714/4, 5, 23, 24, 714/47, 48; 711/152, 156, 163

(56) References Cited

U.S. PATENT DOCUMENTS

| 5,459,863 | A | * | 10/1995 | Taylor | 707/10 |
| 5,708,812 | A | * | 1/1998 | Van Dyke et al. | 717/171 |
| 5,719,495 | A | | 2/1998 | Moslehi | 324/158.1 |
| 5,883,437 | A | | 3/1999 | Maruyama et al. | 257/773 |
| 6,199,065 | B1 | * | 3/2001 | Kenyon | 707/9 |
| 6,243,814 | B1 | * | 6/2001 | Matena | 713/200 |
| 6,256,747 | B1 | * | 7/2001 | Inohara et al. | 714/4 |
| 6,286,056 | B1 | * | 9/2001 | Edgar et al. | 710/5 |
| 6,333,739 | B1 | * | 12/2001 | Koyama et al. | 345/744 |
| 6,393,539 | B1 | * | 5/2002 | Nguyen et al. | 711/164 |
| 6,430,602 | B1 | * | 8/2002 | Kay et al. | 709/206 |
| 6,473,839 | B1 | * | 10/2002 | Kremser et al. | 711/154 |
| 6,484,173 | B1 | * | 11/2002 | O'Hare et al. | 707/9 |

OTHER PUBLICATIONS

SCSI Primary Commands—2 (SPC–2), Rev 18, T10 working draft published at http://www.t10.org/drafts.htm May 2000.
T10 Proposal 99–199r, published at http://www.t10.org/doc99.htm Jun. 1999.

* cited by examiner

Primary Examiner—Robert Beausoliel
Assistant Examiner—Gabriel L. Chu

(57) ABSTRACT

A method for sharing a storage device amongst a plurality of computers while providing data integrity in the storage device is presented. A computer is registered for a reserved access type with the storage device by storing a computer identifier in the storage device. Access to the storage device is provided to the registered computer dependent on the registered computer's stored identifier and the reserved access type. Upon loss of knowledge of the stored identifier in the shared storage device by the registered computer, the computer replaces the previous identifier for the computer stored in the shared storage device with a new identifier. The registered computer may be a currently registered computer or a previously registered computer.

15 Claims, 8 Drawing Sheets

PERSISTENT RESERVATION IO BARRIERS

BACKGROUND OF THE INVENTION

A cluster is a plurality of nodes physically connected to an inter-node communication network. Each of the cluster nodes is a computer system. The computer system may include a Central Processing Unit ("CPU"), memory, an inter-node communications interface and IO subsystem.

A storage device may be connected to the IO subsystem in a node. The storage device may be shared by a plurality of nodes by connecting the device to the IO subsystem in each node. By sharing the storage device amongst a plurality of nodes, multiple paths are provided for accessing the storage device. The multiple paths to the storage device provide redundancy in the case of a failure in one of the nodes by sending an IO request to the storage device through a non-failed node.

A well-known standard interface for connecting storage devices to an IO subsystem is the American National Standards Institute ("ANSI") Small Computer System Interface ("SCSI"). ANSI SCSI defines a protocol for accessing storage devices connected to a storage network. The SCSI protocol permits a storage device connected to a storage network to be shared by a plurality of nodes. The IO subsystem includes in each node a storage network controller. The storage network controller includes logic for issuing IO commands over the storage network to the storage device. The IO commands include a command to read data from the storage device and a command to write data to the storage device.

ANSI SCSI includes a Persistent Reserve command. The Persistent Reserve command allows a storage device to be shared by more than one cluster node. Each storage network controller issues a Persistent Reserve command to the storage device to register with the storage device. A second Persistent Reserve command is issued to reserve the device by specifying the access type. The storage device stores a list of registered storage network controllers with a corresponding registration key and the type of access permitted.

The Persistent Reserve command provides security by requiring registered storage network controllers to provide their registration key before allowing the storage network controller to perform commands restricted to members of the group of registered storage network controllers. For example, if each storage network controller registers with registration type "write exclusive registrants only", only registered storage network controllers have permission to write to the storage device but all other storage network controllers have permission to read from the storage device.

In a cluster, a node failure is communicated to survivor nodes on the inter-node communication network. Upon detecting the node failure, access to the storage device may be provided on an alternative path through survivor node in the cluster connected to the storage device. However, before access can be provided on the alternative path, all the pending IO commands issued by the failed node must be completed or aborted in the storage device in order to guarantee that these IO commands do not interfere with future IO commands from surviving cluster members. A survivor node in the cluster issues a Persistent Reserve command to the shared storage device to request the completion or abortion of all IO commands issued by the failed node in the cluster.

There are two types of SCSI physical connections. A parallel SCSI physical connection provides for the connection of a maximum of sixteen devices including storage devices and storage network controllers. A serial SCSI physical connection provides for the connection of $2^{64}$ devices including storage devices and storage network controllers, switches and routers. Through the SCSI physical connection, a cluster storage device may be accessed by several cluster nodes; that is, nodes connected to a cluster and non-cluster nodes. Through the use of the Persistent Reservation command write access to a cluster storage device can be limited to registered cluster nodes by registering each cluster node with "write exclusive registrants only" registration type.

The "write exclusive registrants only" state remains in effect as long as one of the cluster nodes is registered with the storage device. However, if the persistent reservation from the last cluster node is removed, a non-cluster node or a cluster node from another cluster may write to the storage device and corrupt data stored in the storage device.

SUMMARY OF THE INVENTION

The present invention provides a method for sharing a storage device amongst a plurality of computers while providing data integrity in the storage device. A computer is registered with the storage device by storing a computer identifier associated with a reserved access type in the storage device. Access to the storage device is provided to the registered computer dependent on the registered computer's stored identifier. The type of access provided to the registered computer is dependent on the stored access type. Upon loss of knowledge of the stored identifier in the shared storage device by the registered computer, the identifier for the computer stored in the shared storage device is replaced with a new identifier for the registered computer. The registered computer may be a currently registered computer or a previously registered computer.

Upon detecting a failure in one of the registered computers, one of the survivor registered computers removes the registration for the detected failed computer by requesting deletion of the identifier associated with the reserved access type for the detected failed registered computer in the shared storage device. Outstanding commands in progress from the detected failed registered computer to the shared storage device are aborted. All commands to the shared storage are stalled until all pending commands issued by the detected failed computer are aborted.

The identifier for each computer may be unique or the identifier may be initialized to the same value. If the identifier is initialized to the same value, the identifier assigned to another computer stored after detection of the failed node differs from the previously stored identifiers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
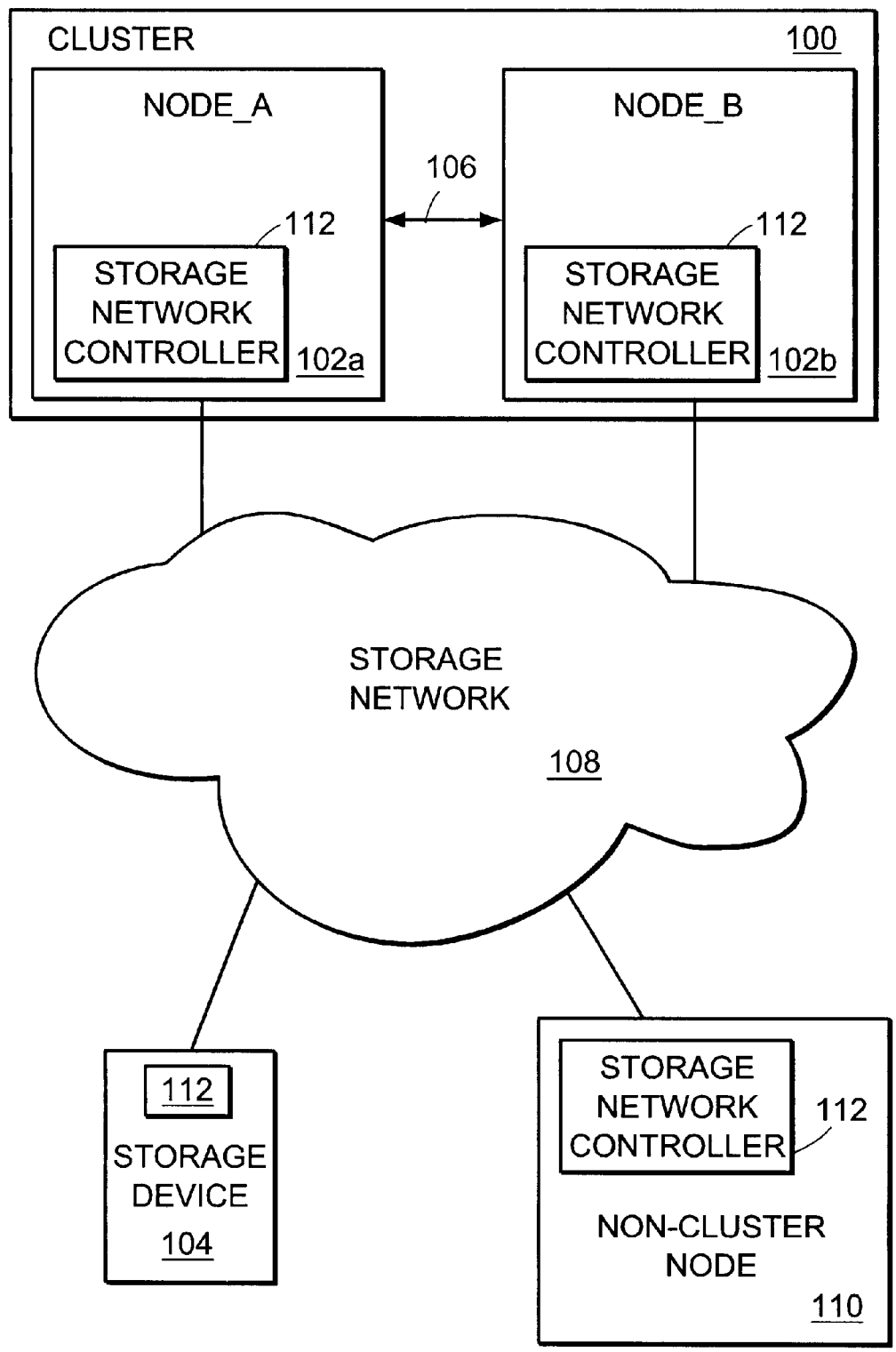
FIG. 1 is a block diagram illustrating a cluster with two nodes, a non-cluster node and a storage device connected to a storage network according to the principles of the present invention.

FIG. 1 illustrates a cluster 100 with two cluster nodes 102a and 102b, a non-cluster node 110 and a storage device 104 connected to a storage network 108. The cluster nodes 102a and 102b are physically connected through an inter-node communications bus 106. Each of the cluster nodes 102a and 102b and the non-cluster node 110 are physically connected to the storage device 104 through the storage network 108.

The storage device 104 may be a disk storage device, a tape storage device, a Redundant Array of Independent Disks ("RAID") or any other type of device well known in the art which can be physically connected to a storage network 108. Each cluster node 102a and 102b and the non-cluster node 110 may access the storage device 104.

The storage network 108 may be a serial storage network such as, Fibre Channel and may include Fibre Channel switches and routers. Alternatively, the storage network may be a parallel storage network. The serial or parallel storage network 108 may be the American National Standards Institute ("ANSI") Small Computer Systems Interface ("SCSI") storage network. Each of the cluster nodes 102a, 102b, the non-cluster node 110 and the storage device 104 include one or more storage network controllers 112 for communicating over the storage network 108.

Each storage network controller 112 includes a unique identifier identifying the storage network controller 112 on the storage network 108. The storage device 104 may be reserved for exclusive use by one or more storage network controllers 112 by storing the storage network controller's unique identifier with an associated access privilege for the storage network controller 112 in the storage device 104. For example, storage network controllers 112 located in a cluster node 102a or 102b may have read and write access privilege for the storage device 104 and a storage network controller 112 in the computer system 110 may have read-only access privilege for the storage device 104. By providing access privileges, a storage device 104 can be reserved for exclusive write access by cluster nodes 102a and 102b in a cluster 100. Thus, even though the non-cluster system node 110 is physically connected to the storage device 104 through the storage network 108, a storage network controller 112 connected to the storage network 108 may not have permission to write to the storage device 104.

Figure 2:
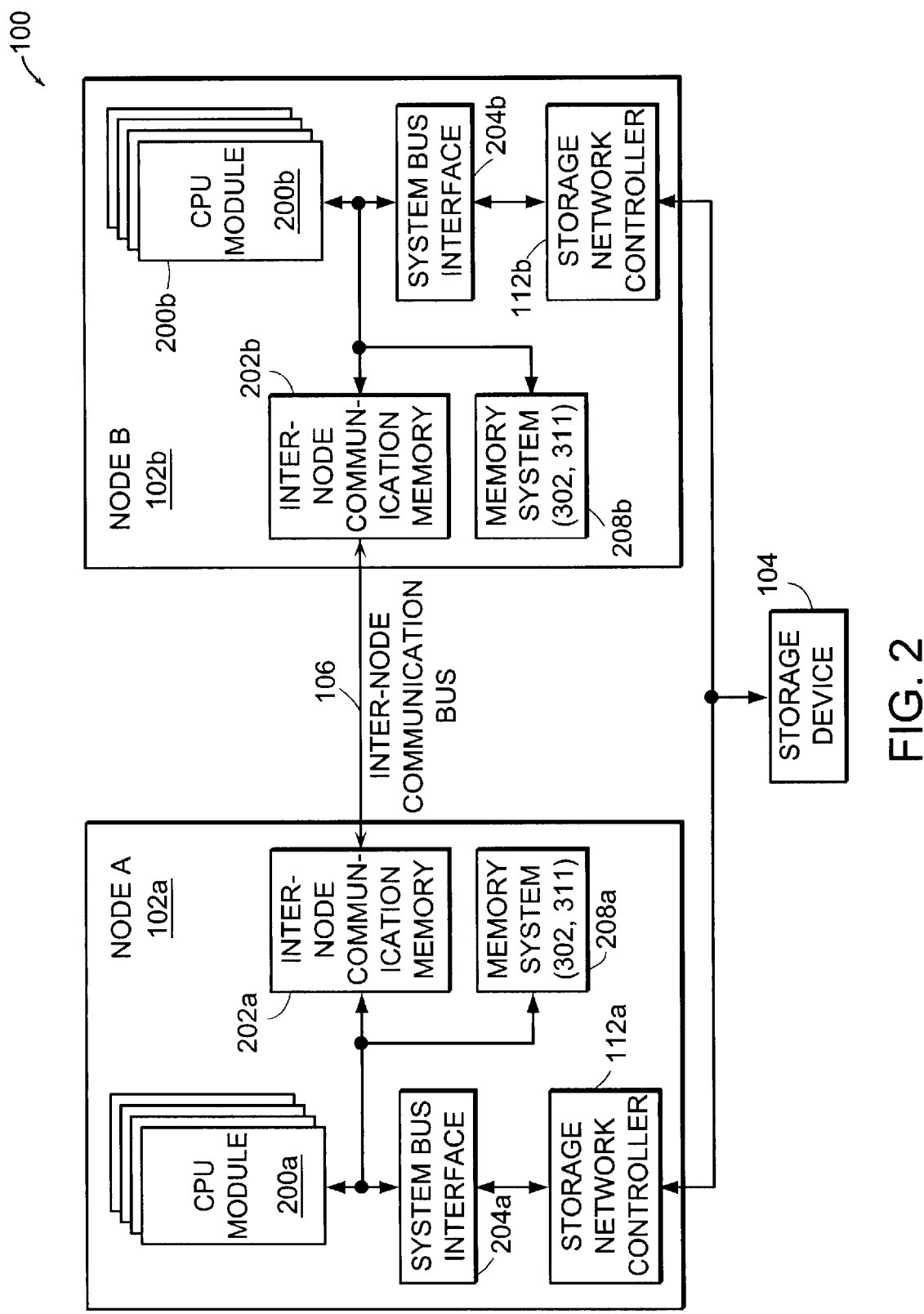
FIG. 2 is a block diagram illustrating a preferred embodiment for the cluster shown in FIG. 1.

FIG. 2 is a block diagram illustrating a preferred embodiment for a cluster 100 with two cluster nodes 102a and 102b.

The cluster 100 is not limited to the two cluster nodes 102a and 102b shown. It is well known in the art that a cluster 100 may include more than two nodes 102a and 102b. Four and eight node clusters are well known in the art. For example, Compaq Computer Corporation's TruCluster64 UNIX 4.0 and TruCluster64 UNIX 5.0 provide support for four and eight node clusters.

Each cluster node 102a, 102b includes a respective CPU module 200a, 200b, a system bus interface 204a, 204b, a storage network controller 112a, 112b, an inter-node communication memory 202a, 202b and a memory system 208a, 208b.

The inter-node communication memory 202a, 202b provides communication between cluster nodes 102a and 102b in the cluster 100 over the inter-node communication bus 106. The inter-node communications bus 106 is used to communicate configuration parameters such as shared storage devices and to detect a node failure. For example, a survivor node may detect a failed node if it does not receive a response to a keep-alive command forwarded over the inter-node communications bus 106 to the failed cluster node 102a, 102b.

Thus, multiple paths are provided to the storage device 104 for access by a client computer system (not shown) connected to the cluster 100. In the case of a failure of a component in one of the cluster nodes 102a, 102b, access to the storage device 104 is provided through the survivor cluster node 102a, 102b. The CPU module 200 in each node 102a and 102b executes storage network routines (not shown) and shared device routines (not shown) stored in each memory system 208.

Each storage network controller 112a, 112b communicates with storage devices including storage device 104 connected to the storage network 108 by forwarding a storage network command on the storage network 108. The storage network command includes a unique storage network identifier for the storage network controller 112 and a unique storage network identifier for the storage device 104.

Figure 3:
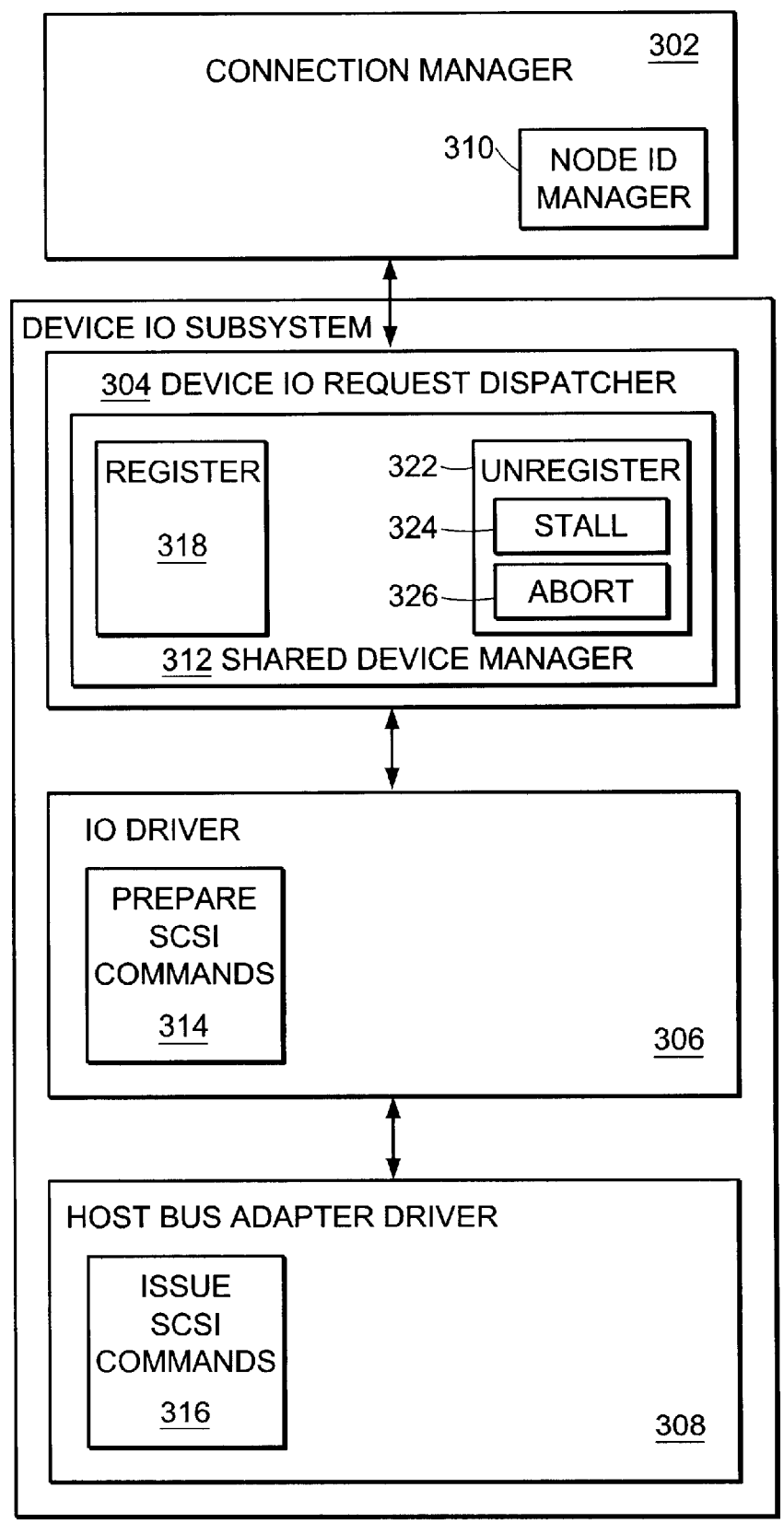
FIG. 3 is a block diagram illustrating storage network routines and shared device routines stored in the memory system of each cluster node shown in FIG. 2 for managing the shared storage device.

FIG. 3 is a block diagram illustrating storage network routines and storage device routines stored in the memory system 208 of each cluster node 102a, 102b shown in FIG. 2 for managing the storage device 104. The software modules stored in each memory system 208a, 208b include a connection manager 302 and a device Input/Output ('I/O') subsystem 311.

The connection manager 302 includes a node identifier manager 310. The node identifier manager 310 assigns a key (an identifier) to a cluster node 102a, 102b each time the cluster node 102a, 102b joins the cluster 100. The key used to register a cluster node 102a, 102b with a storage device 104 may be the same number for each cluster node 102a, 102b in the cluster 100 or may be the unique node identifier generated by the connection manager for each cluster node 102a, 102b in the cluster 100.

If the key used is the same number for each cluster node 102a, 102b, the key is incremented for each cluster node 102a, 102b remaining in the cluster 100 after the detection of a failed cluster node 102a, 102b or a previously failed cluster node 102a, 102b rejoins the cluster 100.

If the key assigned to a cluster node 102a, 102b is a unique number for each cluster node 102a, 102b, the survivor cluster node 102a, 102b retains the previously assigned key after the detection of a failed cluster node 102a, 102b or a previously failed cluster node 102a, 102b rejoins the cluster. However, upon rejoining the cluster, a previously failed cluster node 102a, 102b receives a new key. Thus, a cluster node 102a, 102b is not required to remember the key that was previously assigned by the connection manager 302.

For example, the identifier can include a cluster node number and an incarnation number. If the cluster node number assigned to cluster node 102a is 1 and the cluster node number assigned to cluster node 102b is 2, on the first registration the identifier for cluster node 102a is set to 11. If the incarnation number is incremented each time a cluster node 102a, 102b re-registers with the storage device 104, on the second registration the identifier for cluster node 102a is set to 21

The device IO subsystem 311 includes a device IO request dispatcher 304, an IO driver 306 and a host bus adapter driver 308. The device IO request dispatcher 304 includes a shared device manager 312. The shared device manager 312 includes a register routine 318, and an unregister routine 322. The unregister routine 322 includes a stall routine 324 and a pre-empt and abort routine 326. The shared device manager 312 sends storage network commands to the storage device 104 in the cluster 100 and receives responses from the storage device 104. The storage network commands include a register key command and a reserve command generated in the register routine 318, and a read keys command and a preempt and abort command generated in the unregister routine 322.

The register key command registers the specified key for the cluster node 102a, 102b with the storage device 104. The reserve command requests that the access mode for the device be set to "write exclusive read only". The read keys command requests that the shared device manager 312 return a list of the cluster nodes 102a, 102b that have previously registered with the storage device 104 by returning a list of registration keys stored in the storage device 104. The preempt and abort command remaps registrations, reservations, and aborts IO commands.

The IO driver 306 in the device IO subsystem 311 prepares register key commands and the read key commands to be forwarded on the storage network 108. In a storage network 108 with a Fibre Channel or parallel SCSI physical connection, the storage network command format is defined in the SCSI command protocol. The SCSI commands are described in conjunction with FIGS. 4A–4C.

If the storage network 108 is a SCSI network, the prepare SCSI commands routine 314 in the IO driver 306 prepares SCSI commands for the register key command, reserve command, preempt and abort command and the read keys command. After the IO driver 306 has prepared a SCSI command to be forwarded on the storage network 108 to the shared storage device 104, the issue SCSI command routine 316 in the host bus adapter driver 308 forwards the SCSI command through a storage network controller 112. The storage network controller 112 physically forwards the SCSI command on the storage network 108 to the storage device 104. Each host bus adapter driver 308 may communicate with a plurality of storage network controllers 112. Typically a host bus adapter driver 308 communicates with a particular type of storage network controller 112.

Figure 4A:
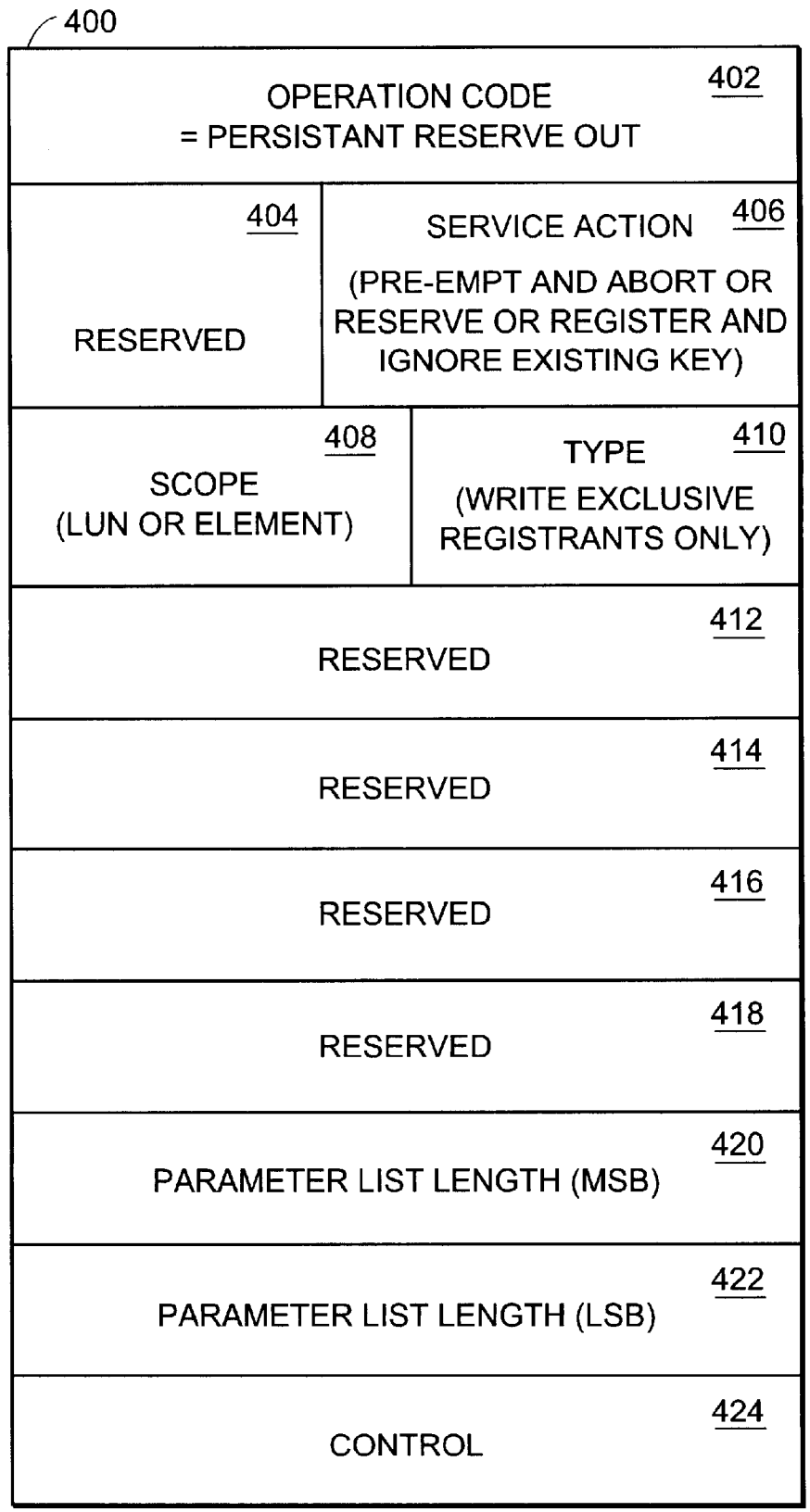
FIG. 4A is a block diagram illustrating a SCSI Persistent Reserve Out command.

FIG. 4A is a block diagram illustrating a SCSI Persistent Reserve Out command 400. Upon a request from the register routine 318, the host bus adapter driver 308 forwards a SCSI Persistent Reserve Out command 400 to the storage device 104, to register a cluster node 102a, 102b with the storage device 104 and another Persistent Reserve Out command 400 to reserve the device for "write exclusive read only" access. Upon a request from the unregister routine 322, after detection of a failed registered cluster node 102a, 102b by the connection manager 302, the host bus adapter driver 308 forwards a SCSI Persistent Reserve Out command 400 to the storage device 104, to preempt and abort outstanding storage network commands issued from the failed registered cluster node 102a, 102b.

The SCSI Persistent Reserve Out command 400 includes a Persistent Reserve operation code 402, a service action field 406, a scope field 408, a type field 410, parameter list length fields 420, 422, a control field 424 and reserved fields 404, 412,414, 416,418. The contents of the service action field 406 determine the action to be performed by the storage device 104.

The contents of the scope field 408 determine whether the key is to be registered with the entire shared storage device 104 or a media changer element if the shared storage device is a media changer.

The content of the type field 410 determines the type of access assigned to the cluster node 102a, 102b associated with the registration key. In the cluster 100, each cluster node 102a, 102b registers with the type field 410 set to "write exclusive registrants only." While a storage device 104 is reserved with type field 410 set to "write exclusive registrants only," only registered cluster nodes 102a, 102b can issue "write" type commands to the shared storage device 104. The cluster node's assigned key is forwarded in a SCSI Persistent Reserve command's parameter list. The parameter list is described in conjunction with FIG. 4B.

Figure 4B:
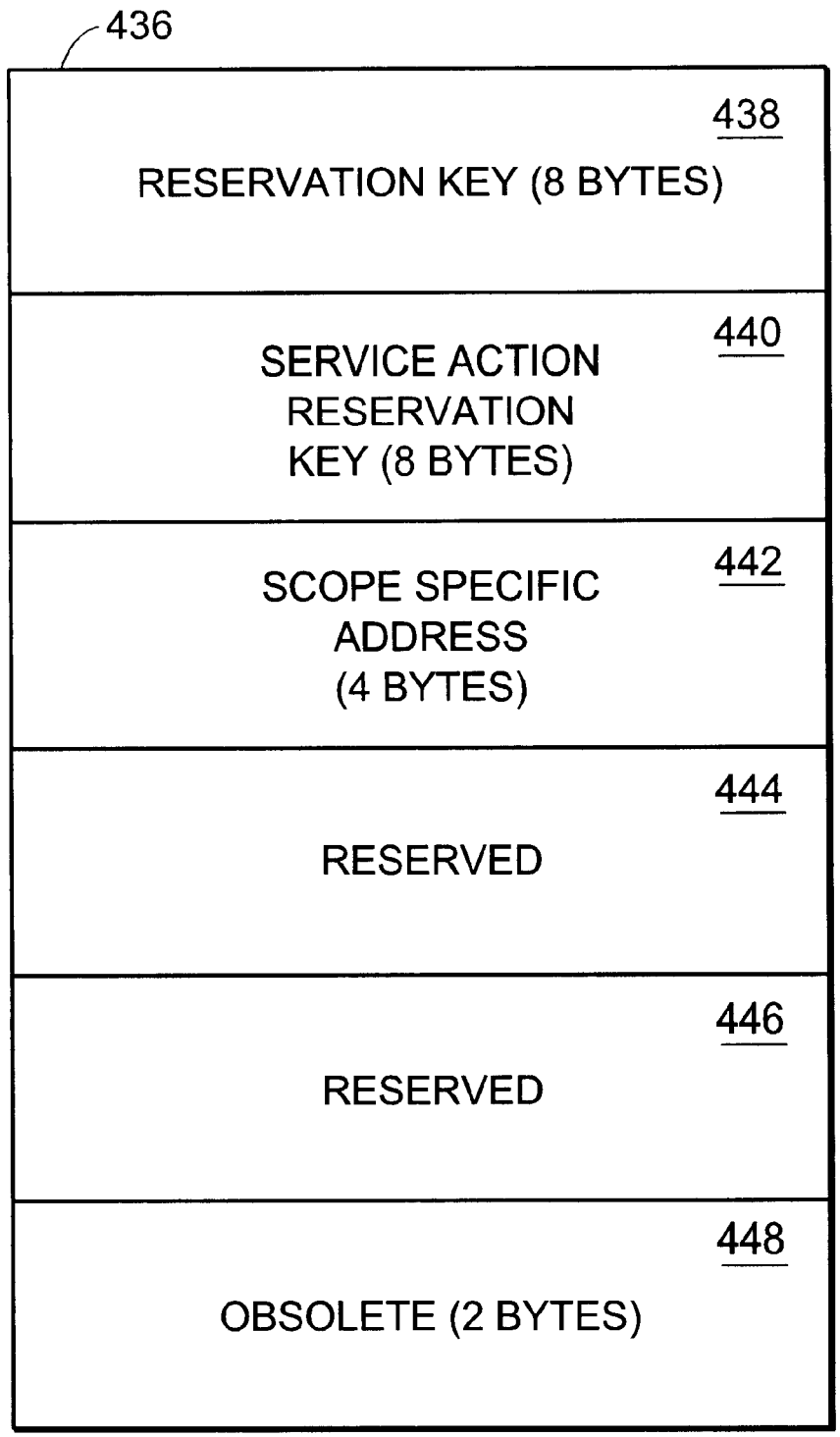
FIG. 4B is a block diagram illustrating the parameters communicated in the SCSI Persistent Reserve Out command shown in FIG. 4A.

FIG. 4B is a block diagram illustrating the parameter list 436 forwarded with the Persistent Reserve Out command 400 shown in FIG. 4A. The parameter list length fields 420, 422 (FIG. 4A) in the Persistent Reserve Out command 400 store the total number of bytes in the parameter list 436. The parameter list 436 includes a reservation key 438, a service action reservation key 440, a scope specific address 442, reserved fields 444, 446 and an obsolete field 448.

To register a cluster node 102a, 102b, the prepare SCSI command routine 314 (FIG. 3) prepares two Persistent Reserve Out commands 400 to be issued to the storage device 104. In the first Persistent Reserve Out command 400, the prepare SCSI command routine 314 stores the key assigned to the cluster node 102a, 102b by the DeviceIO Request Dispatcher 304 (FIG. 3) in the service action reservation key field 440 and sets the service action field 406 to "register and ignore existing key" and forwards the Persistent Reserve Out command 400 and the parameter list 436 to the host bus adapter driver 308 (FIG. 3). In the second Persistent Reserve Out comand 400, the prepare SCSI command routine 314 sets the service action field 406 to "reserve" and the type field 410 to "write exclusive registrants only" and forwards the Persistent Reserve Out command 400 and the parameter list 436 to the host bus adapter driver 308 (FIG. 3).

Upon detecting a failed cluster node 102a, 102b, a surviving cluster node 102a, 102b issues a Persistent Reserve Out command 400 with service action field 406 set to "preempt and abort," the key assigned to the survivor cluster node 102a, 102b is stored in the reservation key field 438 and the key assigned to the failed cluster node 102a, 102b is stored in the service action reservation key field 440. The scope specific address field 442 is set to '0' unless the reserve request is directed to an element in a media changer.

Figure 4C:
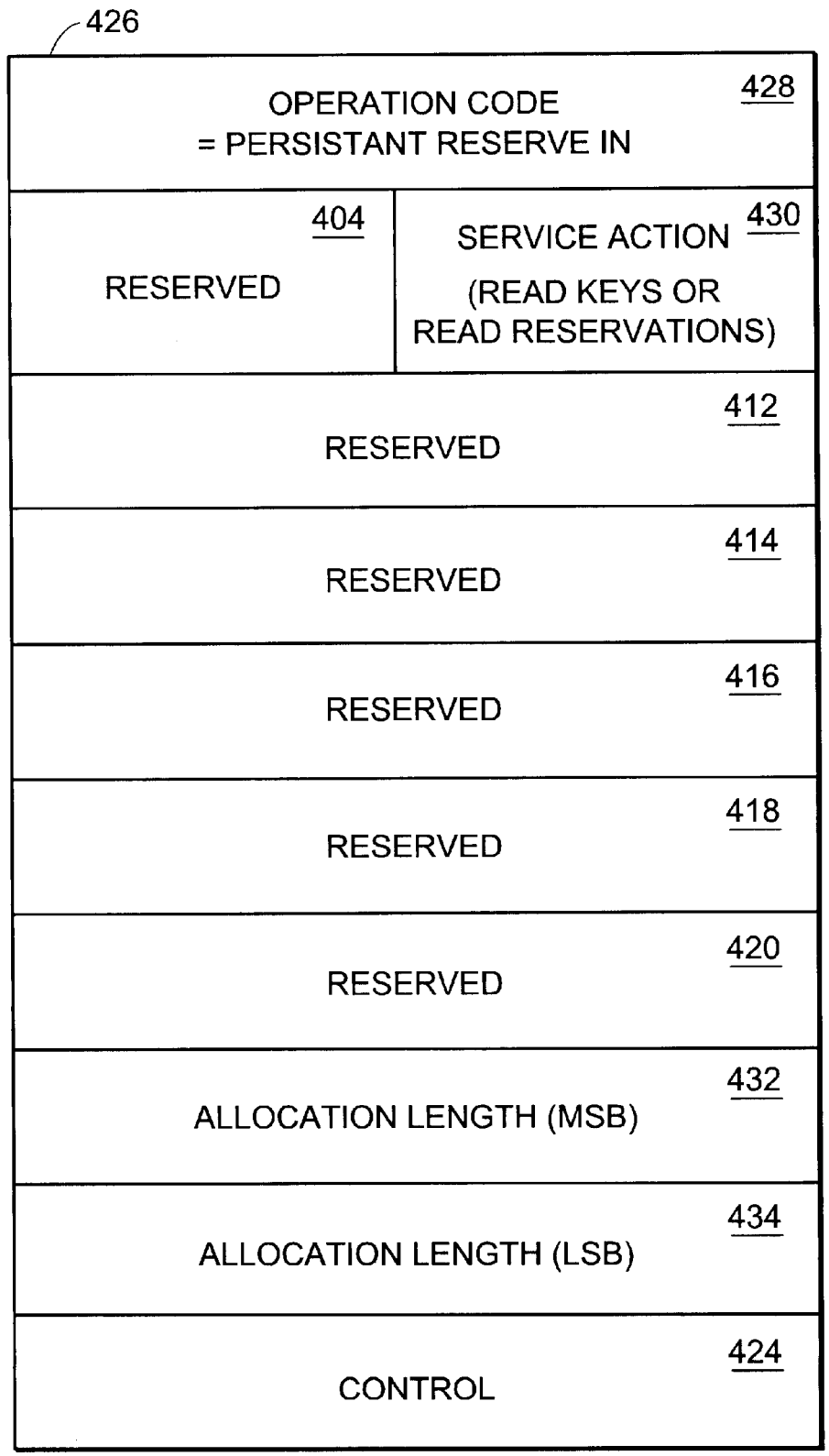
FIG. 4C is a block diagram illustrating a SCSI Persistent Reserve In command.

FIG. 4C is a block diagram illustrating a Persistent Reserve In command 426. The Persistent Reserve In command 426 includes a Persistent Reserve In operation code field 428, a service action field 430, allocation length fields 432,434, a control field 424 and reserved fields 412, 414, 416, 418, 420. Setting the service action field 430 to "read keys" or "read reservations" returns a list of registered keys and associated data stored in the storage device 104. The associated data includes the type field 410 and scope field 408 written to the storage device in the Persistent Reservation Out command 400.

Figure 5:
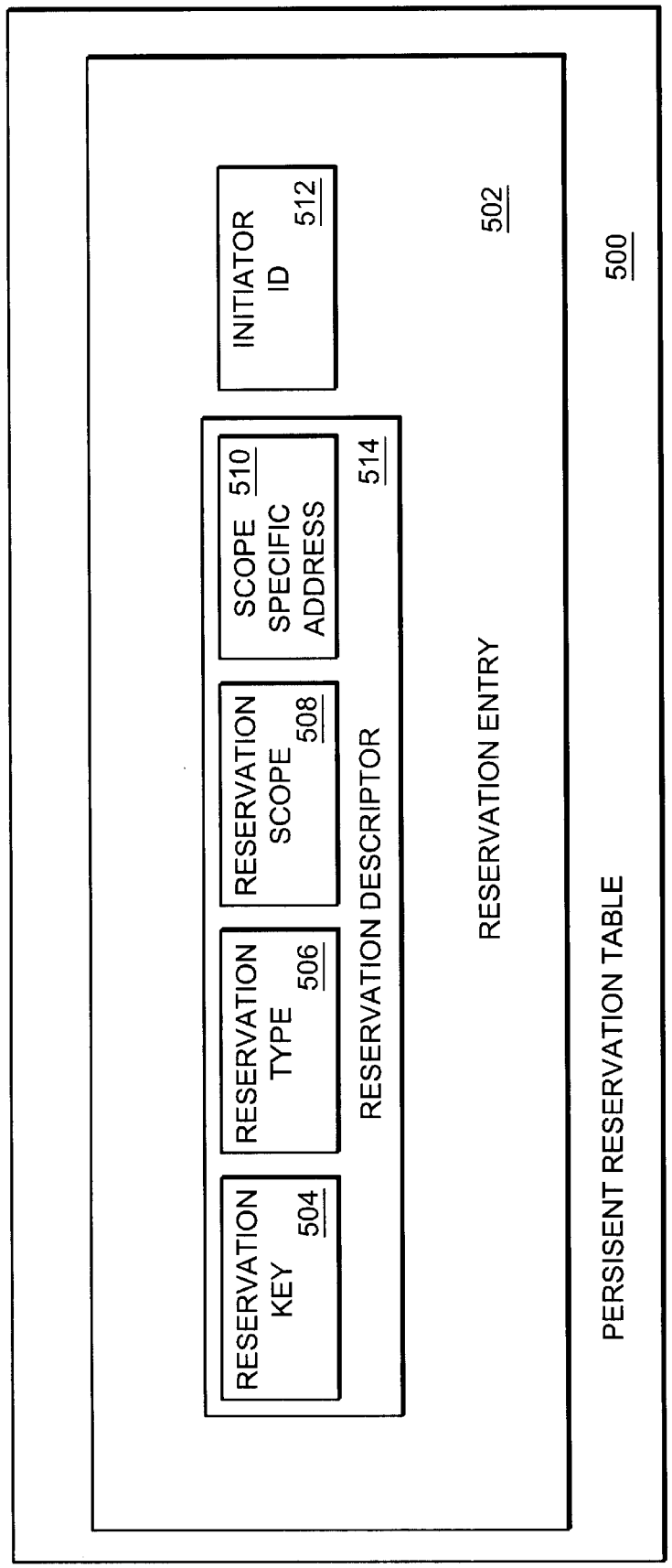
FIG. 5 is a block diagram illustrating a Persistent Reserve table stored in the shared storage device.

FIG. 5 is a block diagram illustrating a Persistent Reserve table 500 stored in the storage device 104. The Persistent Reserve table 500 includes a reservation entry 502 for each reservation. The reservation entry 502 includes an initiator identifier 512 and a reservation descriptor 514. The initiator identifier 512 identifies the storage network controller 112 from which the Persistent Reserve Out command 400 was received. Each storage network controller 112 on a storage network 108 has a unique identifier.

The reservation descriptor 514 includes a reservation key field 504, a reservation type field 506, a reservation scope field 508 and a scope specific address field 510. The data stored in the reservation descriptor 514 is dependent on the contents of the parameter list 436 forwarded with the Persistent Reserve Out command 400. The contents of the reservation descriptor 514 are returned in the reservation list (not shown) with the Persistent Reserve In command 426.

The reservation key field 504 stores a reservation key assigned to a cluster node 102a, 102b by the DeviceIO Request Dispatcher 304 (FIG. 3). Each cluster node 102a, 102b may include a plurality of storage network controllers 112. The storage device 104 is protected from non-registered storage network controllers 112 while a storage network controller 112 is registered with reservation type set to "write exclusive registrants only". The storage device 104 processes a write command received from a cluster node 102a, 102b if the persistent reservation table 500 indicates that there are no current persistent reservations. The shared storage device 104 searches the persistent reservation table 500. If the storage device 104 finds a reservation entry 502 in the persistent reservation table 500 for the initiator identifier 512 from which the write command was received, the write command is processed. However, if there is no reservation entry 502 for the initiator identifier 512 and there is a reservation descriptor 514 with the reservation type field 506 set to "write exclusive registrants only," a non-registered storage network controller 112 cannot write to the storage device 104.

Figure 6:
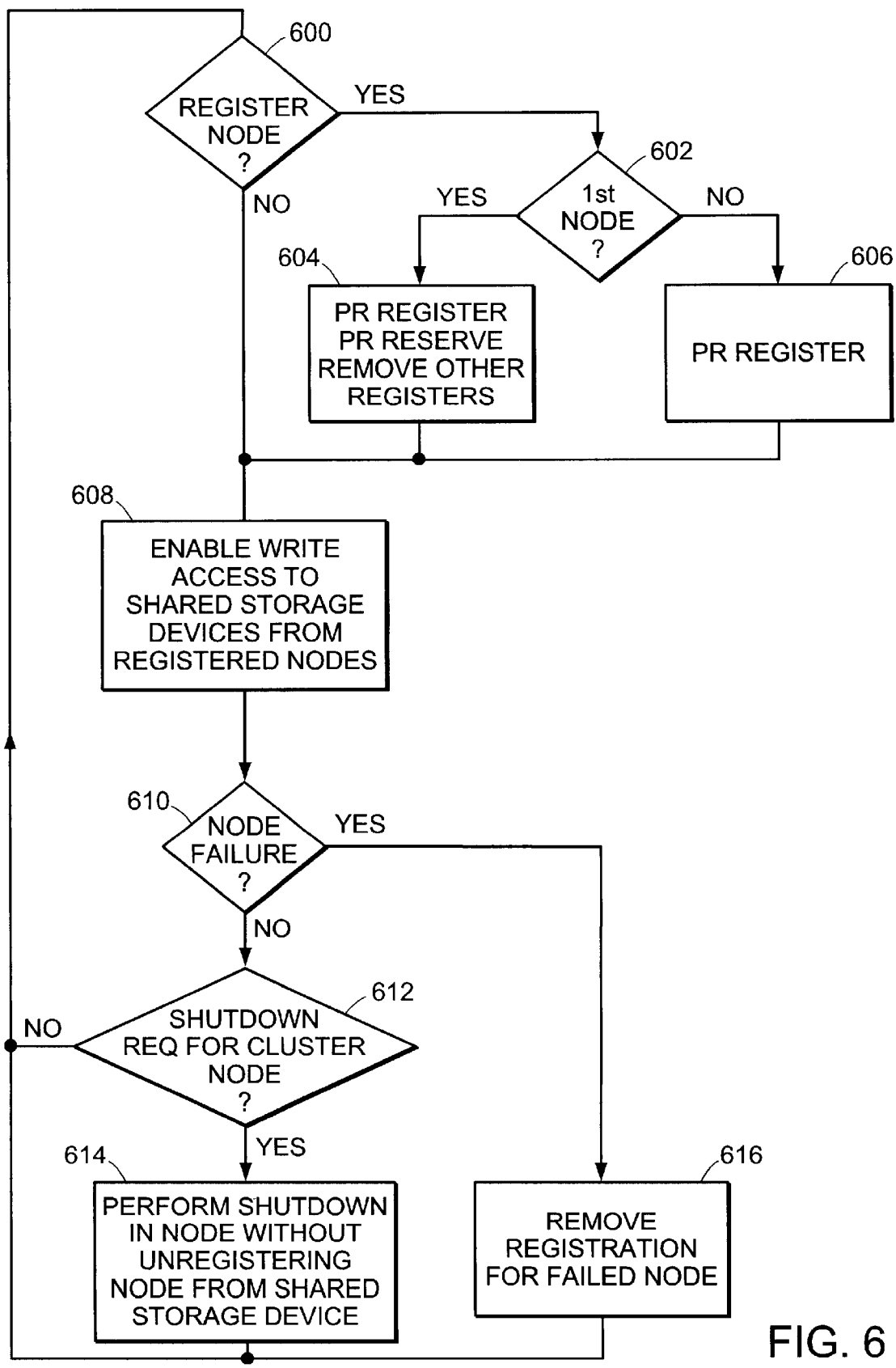
FIG. 6 is a flow chart illustrating the steps executed in the memory system shown in FIG. 2 for managing access to the shared storage device.

FIG. 6 is a flow chart illustrating the steps executed in the memory system 208 shown in FIG. 2 for managing access to the shared storage device 104. FIG. 6 is described in conjunction with FIGS. 2, 3, 4A–C and 5.

At step 600, the DeviceIO Request Dispatcher 304 determines whether to register a cluster node 102a, 102b in the cluster 100 with the shared storage device 104 dependent on whether the DeviceIO Request Dispatcher 304 can see the device from the storage network controller 112a, 112b. If so, processing continues with step 602. If not, processing continues with step 608.

At step 602, the cluster node 102a, 102b determines whether it is the first cluster node 102a, 102b in the cluster 100 to register with the storage device 104. If so, processing continues with step 604. If not, processing continues with step 606.

At step 604, the DeviceIO Request Dispatcher 304 assigns a key, for the cluster node 102a, 102b. The key may be either cluster global or node specific from the connection manager 302. The register routine 318 in the device IO request dispatcher 304 issues a request to register the cluster node 102a, 102b with each desired shared storage device 104 connected to the storage network 108. The register request is translated to a SCSI Persistent Reserve Out command 400 in the prepare SCSI commands routine 314 in the IO driver 306 and issued to the shared storage device 104 in the issue SCSI commands routine 316 in the host bus adapter driver 308. In particular, first the SCSI Persistent Reserve Out command 400 with "register and ignore" in the service action field 406 and assigned key in the parameter list (not shown) is issued, then the SCSI Persistent Reserve Out command 400 with "write exclusive registrants only" in the type field 410 and "reserve" in the service action field 406 is issued. The first cluster node also removes registrations for all other registered cluster nodes in the storage device 104 as will be discussed later in conjunction with step 616. Processing continues with step 608.

At step 606, a cluster node 102a, 102b in the cluster node 100 has already registered. Thus, a reservation already exists for the cluster 100 in the storage device 104. The DeviceIO Request Dispatcher 304 assigns a key, for the cluster node 102a, 102b. The key may be either cluster global or node specific from the connection manager 302. The register routine 318 in the device IO request dispatcher 304 issues a request to register the cluster node 102a, 102b with each desired shared storage device 104 connected to the storage network 108. The register request is translated to a SCSI Persistent Reserve Out command in the prepare SCSI commands routine 314 in the IO driver 306 and issued to the shared storage device 104 in the issue SCSI commands routine 316 in the host bus adapter driver 308. Only the SCSI Persistent Reserve Out command 400 with "register and ignore" in the service action field 406 and assigned key in the parameter list (not shown) is issued. Processing continues with step 608.

At step 608, the connection manager 302 through the inter-node communications memory 202 monitors communication between cluster nodes 102a, 102b in the cluster 100. Upon detecting a request from a node to join the cluster 100, processing continues with step 608. The request to join the cluster 100 may be from an existing previously failed cluster node 102a, 102b or from a node requesting membership of the cluster for the first time. If a request to join the cluster 100 is not detected processing continues with step 602.

At step 608, access is enabled to the shared storage device 104. The registered cluster nodes 102a, 102b having gone through step 600 are permitted to write data to the shared storage device because the type of reservation enabled is "write exclusive registrants only". This type was stored in the reservation type field 506 in the reservation entry 502 in the persistent reservation table 500 in response to the issued SCSI Persistent Reserve Out command 400 with type field 410 set to "write exclusive registrants only" in step 604. Processing continues with step 610.

At step 610, the connection manager 302 through the inter-node communication memory 202 monitors communication between cluster nodes 102a, 102b in the cluster 100. Upon detecting a failed node 102a, 102b, processing continues with step 616. If a failed cluster node 102a, 102b is not detected, processing continues with step 612.

At step 612, the connection manager 302 determines if there is a request to perform an orderly shutdown of the operating system. If so, processing continues with step 614. If not, processing continues with step 602.

At step 614, a shutdown routine (not shown) in the cluster node 102a, 102b performs an orderly shutdown of the operating system so that no data corruption occurs. The system may also be shutdown after the detection of an illegal condition; that is, a "system crash". Typically a system crash recovery routine is executed after the detection of an illegal condition. The system crash recovery routine attempts to write the state of the operating system upon detection of the illegal condition to a storage device before executing the shutdown routine.

The shutdown routine may return IO requests queued in the shared storage device 104 but does not remove the reservation or registration for the cluster node 102a, 102b from the shared storage device 104. As long as one reservation remains on the shared storage device 104 for one cluster node 102a, 102b, only registered cluster nodes are permitted to write to the shared device. Upon restarting the cluster node 102a, 102b processing begins at step 600.

At step 616, the unregister routine 322 in the survivor cluster node 102a, 102b requests the registered keys from the shared storage devices 104 associated with the failed node. Upon a request from the unregister routine 322 executing in the survivor node 102a, 102b to read the keys, the prepare SCSI commands routine 314 prepares a Persistent Reserve In command 426 (FIG. 4C) with the service action field 430 set to "read keys". The issue SCSI commands routine 316 in the host bus adapter driver 308 issues the Persistent Reserve In command to the shared storage device 104. The shared storage device 104 returns a list of registration keys.

The unregister routine 322 in the survivor node 102a, 102b then removes the failed cluster node's registration. The abort routine 326 in the survivor node 102a, 102b requests that all queued storage network commands from the failed cluster node 102a, 102b be returned. Upon a request to remove the registration and reservation for a failed cluster node 102a, 102b from unregister routine 322 executing in the survivor cluster node 102a, 102b, the prepare SCSI commands routine 314 prepares a Persistent Reservation Out command 400 (FIG. 4A) with the service action field 406 set to "preempt and abort" and the reservation key field 438 in the parameter list 436 (FIG. 4B) set to the survivor node's key and the service action reservation key field 440 set to the failed node's key. The issue SCSI command routine 316 in the host bus adapter driver 308 forwards the Persistent Reservation Out command 400 to the shared storage device 104.

Upon detection of the failed node 102a, 102b, the stall routine 324 in the survivor node 102a, 102b stalls all queued storage network commands issued to the shared storage device 104. Upon receiving a request to abort from the abort routine 326 in the survivor node 102a, 102b, the queued storage network commands issued by the failed cluster node 102a, 102b are aborted and the reservation entry and the registration 502 for the failed cluster node 102a, 102b are removed from the persistent reservation table 500. Processing continues with step 600.

Thus, the shared storage device 104 is protected from data corruption by other devices connected to the storage network 108 even when all the cluster nodes 102a, 102b are shutdown. Also, as described in conjunction withe step 606 a cluster node 102a, 102b does not need to remember the key with which it registered in order to rejoin the cluster 100 after all cluster nodes 102a, 102b in the cluster 100 have been shutdown.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention as defined by the appended claims.

What is claimed is:

1. A method for sharing a storage device among a plurality of computers while providing data integrity in the storage device, the method comprising the steps of:

registering a computer of the plurality of computers with the storage device by storing in the storage device a computer identifier associated with a reserved access type in the storage device; and upon loss of a knowledge of the stored identifier in the shared storage device by the registered computer, replacing the identifier for the registered computer stored in the shared storage device with a new identifier for the registered computer upon detection of a failure in one of the registered computers, un-registering the detected failed registered computer by one of a plurality of survivor registered computers by requesting deletion of the identifier associated with the reserved access type for the detected failed registered computer in the shared storage device.

2. The method as claimed in claim 1, wherein the step for unregistering further comprises the step of:

aborting outstanding commands in progress from the detected failed registered computer to the shared storage device.

3. The method as claimed in claim 1 wherein the step for unregistering further comprises the step of:

upon detection of the failure, stalling all commands to the shared storage device until all pending commands from the detected failed registered computer are aborted.

4. The method of claim 1 wherein the computer identifier for each computer is initialized to the same value.

5. The method of claim 4 wherein the identifier assigned to another computer stored after detection of the failed registered computer differs from the previously stored identifiers.

6. An apparatus for sharing a storage device among a plurality of computers while providing data integrity in the storage device, the apparatus comprising:

a register routine which registers a computer with a storage device by storing in the storage device a computer identifier associated with a reserved access type in the storage device, and upon detection of loss of knowledge of the stored computer identifier in the shared device by the registered computer, replaces the identifier for the registered computer stored in the shared storage device with a new identifier for the registered computer;

an unregister routine which upon receiving notice of a failed registered computer removes write access for the failed registered computer by requesting deletion of the computer identifier associated with the reserved access type for the detected failed registered computer in the storage device.

7. The apparatus as claimed in claim 6 wherein the unregister routine further comprises:

an abort routine which requests the abortion of outstanding commands in progress from the detected failed registered computer to the storage device.

8. The apparatus as claimed in claim 6 wherein the unregister routine further comprises:

an stall routine which stalls all commands in the storage routine until all outstanding commands from the detected failed computer to the storage device are aborted.

9. The apparatus as claimed in claim 6 wherein the identifier for each computer is initialized to the same value.

10. The apparatus as claimed in claim 9 wherein the identifier assigned to another computer stored after detection of the failed node differs from the previously stored identifiers.

11. An apparatus for sharing a storage device among a plurality of computers while providing data integrity in the storage device, the apparatus comprising:

means for registering a computer of the plurality of computers with a shared storage device by storing in the storage device an identifier associated with a reserved access type for the shared storage device; and upon detection of loss of knowledge of the stored identifier in the shared device by the registered computer, means for replacing the identifier for the registered computer stored in the shared storage device with a new identifier for the registered computer means for unregistering a failed registered computer in the shared storage device upon receiving notice of the failed registered computer by requesting removal of write access for the detected failed registered computer by requesting deletion of the identifier associated with the reserved access type for the failed registered computer in the shared storage device.

12. The apparatus as claimed in claim 11 wherein the means for unregistering further comprises:

means for aborting outstanding commands in progress from the failed registered computer to the shared storage device.

13. The apparatus as claimed in claim 11 wherein the means for unregistering further comprises:

means for stalling all commands in the shared storage routine until all pending commands from the failed registered computer to the shared storage device are aborted.

14. The apparatus as claimed in claim 11 wherein the identifier for each computer is initialized to the same value.

15. The apparatus as claimed in claim 14 wherein the identifier assigned to another computer stored after detection of the failed node differs from the previously stored identifiers.

* * * * *